United States Patent
Kobayashi (10) Patent No.: US 7,271,927 B2
(45) Date of Patent: Sep. 18, 2007

(54) DATA CONTROL APPARATUS, DATA CONTROL METHOD THEREOF AND IMAGE FORMING APPARATUS

(75) Inventor: Kazunori Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 935 days.

(21) Appl. No.: 10/075,458

(22) Filed: Feb. 15, 2002

(65) Prior Publication Data

US 2002/0114000 A1   Aug. 22, 2002

(30) Foreign Application Priority Data

Feb. 15, 2001   (JP) ............................. 2001-037976

(51) Int. Cl.
   *G06F 15/00* (2006.01)
(52) U.S. Cl. ..................................... 358/1.15
(58) Field of Classification Search ................ 358/1.1, 358/1.9, 1.12, 1.13, 1.14, 1.15
   See application file for complete search history.

(56) References Cited

U.S. PATENT DOCUMENTS 5,440,632 A    8/1995   Bacon et al.
6,266,810 B1 *  7/2001   Tanaka et al. .............. 717/173

FOREIGN PATENT DOCUMENTS

| EP | 0 504 860 | 9/1992 |
|---|---|---|
| EP | 1 156 417 | 11/2001 |
| WO | WO96/02034 | 1/1996 |
| WO | WO 00/28426 | 5/2000 |

OTHER PUBLICATIONS

Patent Abstracts of Japan, JP 11-272634, Oct. 8, 1999.
Patent Abstracts of Japan, JP 2000-263897, Sep. 26, 2000.
U.S. Appl. No. 10/075,458, filed Feb. 15, 2002, Kobayashi.
U.S. Appl. No. 10/352,594, filed Jan. 29, 2003, Kobayashi.

* cited by examiner

*Primary Examiner*—Dov Popovici
(74) *Attorney, Agent, or Firm*—Oblon, Spivak, McClelland, Maier & Neustadt, P.C.

(57) ABSTRACT

The apparatus includes: an extension devices interface to which a plurality of extension devices are connectable; a connector to which predetermined IC cards are detachably applied; a rewritable program memory for a main body to store a control program of the main body; a CPU for controlling the respective devices and for processing input image data on the basis of the control program of the main body; and an image control unit to achieve control based on control of the CPU for recording and outputting the image data which have been processed and outputting them to any one of the extension devices. The extension devices interface includes control data lines for transferring and receiving control data with the extension devices, and down load exclusive lines for down loading a control program of the extension device of the extension devices.

34 Claims, 7 Drawing Sheets

FIG. 3B

DATA CONTROL APPARATUS, DATA CONTROL METHOD THEREOF AND IMAGE FORMING APPARATUS

BACKGROUND OF THE INVENTION

1. Field of the Invention

The present invention relates to a data control apparatus, a data control method and an image forming apparatus, more specifically relates to a data control apparatus, a data control method and an image forming apparatus in which transfer of control program to a plurality of extension peripheral devices are carried out by down load through a communication means from an external recording medium connected with the main body.

2. Description of the Prior Art

Heretofore in an image forming apparatus a control program thereof or the like is achieved with stored in read only memory (ROM) which is set up in the apparatus.

However, when the program thereof is need to modify for the reason of an occurrence of bug and so on, it is required that the ROM in which the program is stored must be exchanged.

For this work to exchange the ROM, the image forming apparatus must be disassembled into a level in which the ROM can be exchanged, in particular when the image forming apparatus is completed as a final product it takes a lot of labor and time.

On that account a flash ROM becomes utilized to store the program to reduce the working hours for the exchange in these days.

Figure 3A:
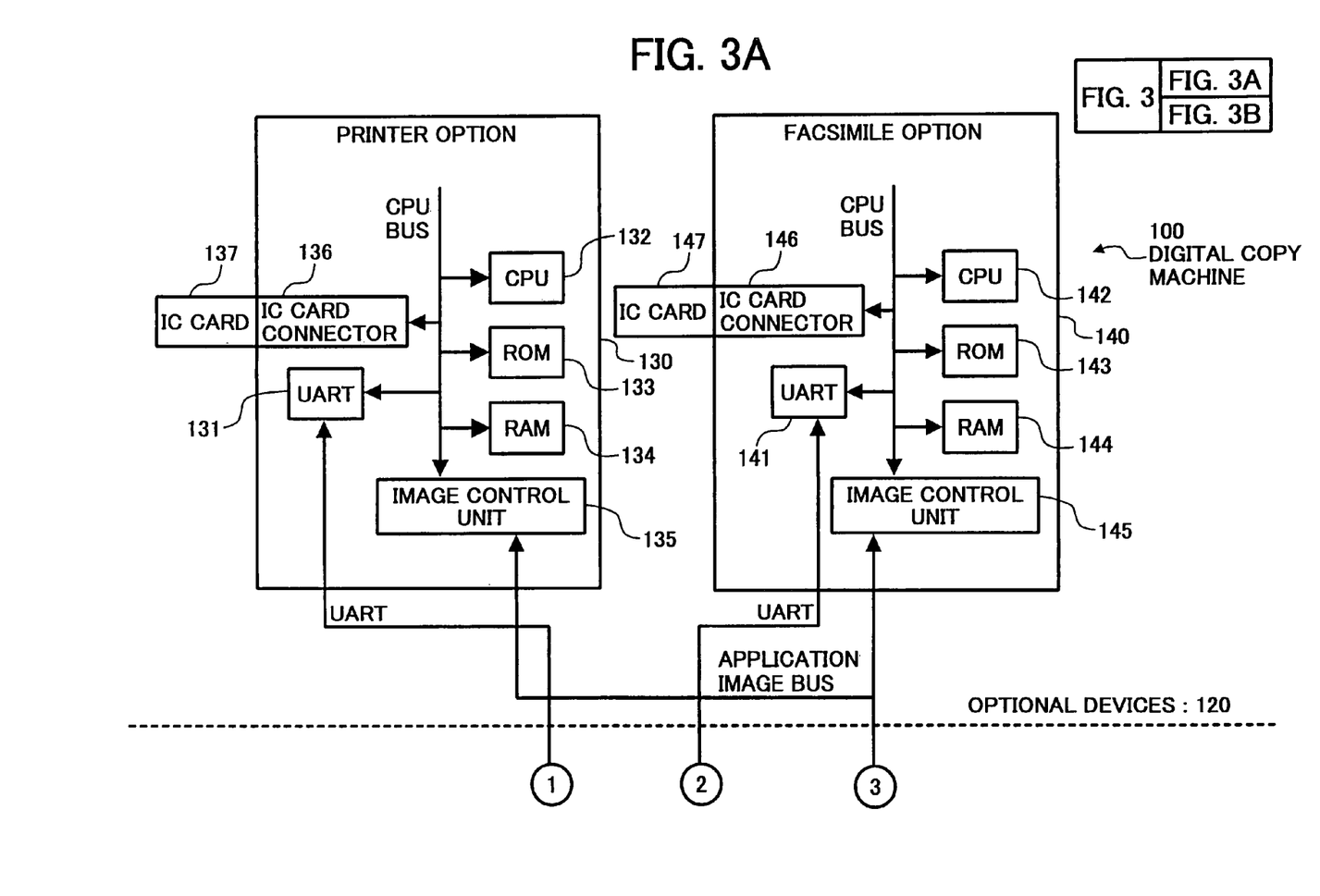
FIG. 3 is a block diagram showing show a structure of relevant portion of a digital copy machine in the prior art technology.
Figure 3B:
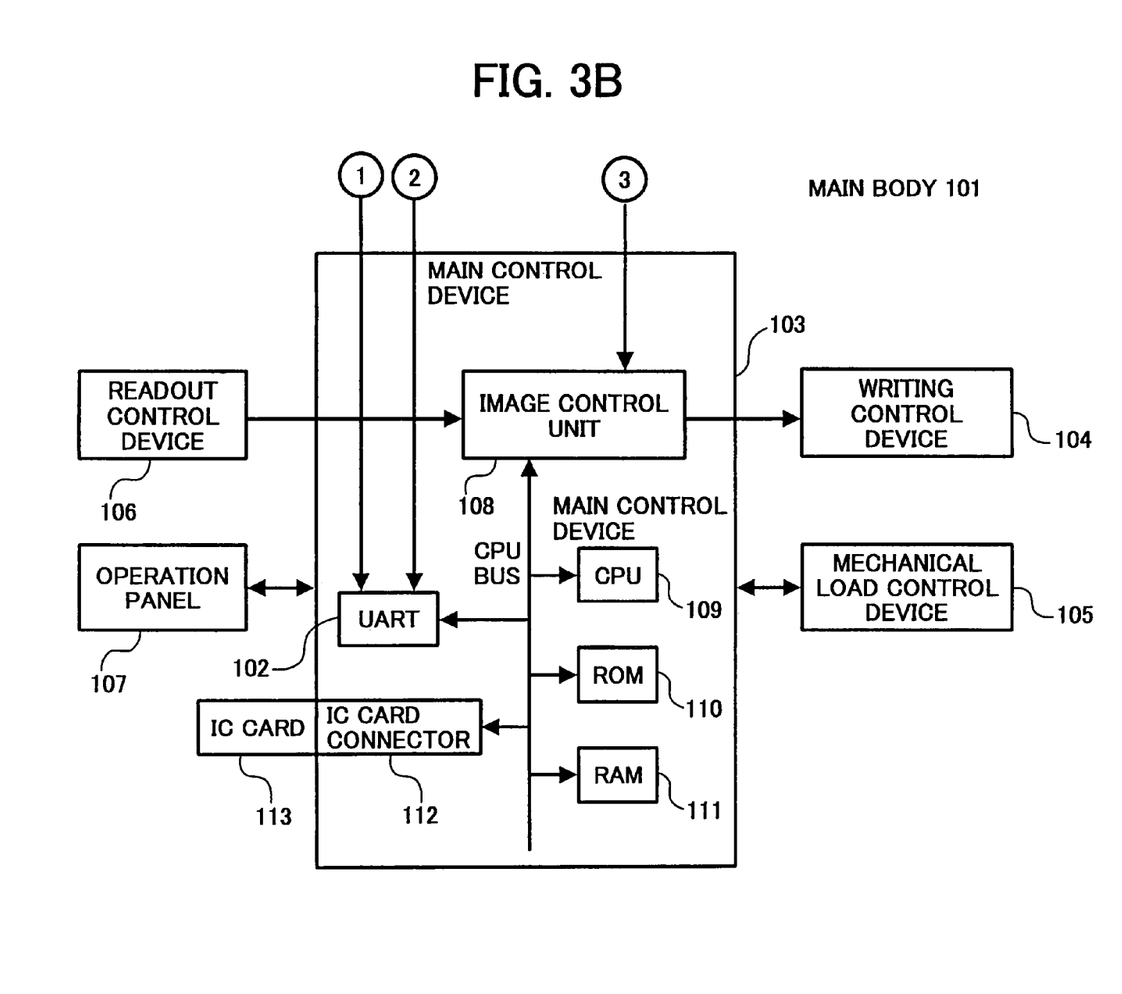

Consequently, in the prior art technology a digital copy machine such as shown in FIG. 3 denoted with the reference numeral 100 has been realized. This digital copy machine 100 comprises a main body 101 and as optional devices 120, a printer option 130 and a facsimile option 140 which are built in the main body 101. The main body 101 and the respective options 130, 140 are connected with UART (universal asynchronous receiver transmitter; asynchronous serial communication) 102, 131, 141 which are provided in the respective parts and application image bus.

The main body 101 comprises a main control device 103, a writing control device 104, a mechanical load control device 105, a readout control device 106, an operation panel 107 and so on. The main control device 103 includes in addition to the above described UART 102, an image control unit 108, a CPU (Central Processing Unit) 109, a ROM (Read Only Memory) 110, a RAM (Random Access Memory) 111, an IC (Integrated Circuit) card (ICCARD) connecter 112, and so on. As for the ROM 110, a flash ROM is used.

The main body 101 controls the respective devices of the digital copy machine 100 on the basis of a control program stored in the ROM 110 with utilizing the RAM 111 as a work memory to achieve processes as a digital copy machine 100.

An image scanning device (not shown) which actually reads out image of original manuscript is connected to the readout control device 106. The image scanning device is controlled to read out the image of manuscript by the readout control device 106 under control of the CPU 109, then the read out image data are output to the image control unit 108 of main control device 103.

Various types of keys (not shown) and a display (not shown) are furnished in the operation panel 107 to display various information on the display under control of the main control device 103 and to output content of key manipulation to the main control device 103.

A printing engine (not shown) is connected to the writing control device 104 to output an image for recording on a recording paper in the electrophotography method, and the printing engine is made to output and record an image based on the image data sent from the image control unit 108 on the recording paper by the writing control device 104 under control of the main control device 103.

The mechanical load control device 105 controls various types of machinery mechanisms under control of the main control device 103.

To the IC card connector 112, IC cards 113 are detachably inserted, and when the control program in a ROM 110 is updated, an IC card 113 in which the updated control program is stored, is inserted to the IC card connector 112.

The printer option 130 is provided with a CPU 132, a ROM 133, a RAM 134, an image control unit 135, an IC card connector 136 and so on in addition to the above described UART 131, as for the ROM 133 a flash ROM is used.

In the printer option 130, the CPU 132 controls the respective devices of the printer option 130 on the basis of a control program stored in the ROM 133 with utilizing the RAM 134 as a work memory to achieve a printing process.

To the IC card connector 136, IC cards 137 are detachably inserted, and when the control program in a ROM 133 is updated, an IC card 137 in which the control program for updating operation is stored, is inserted to the IC card connector 136.

The facsimile option 140 is provided with a CPU 142, a ROM 143, a RAM 144, an image control unit 145, an IC card connector 146 and so on in addition to the above described UART 141, as for the ROM 143 a flash ROM is used.

In the facsimile option 140, the CPU 142 controls the respective devices of the facsimile option 140 based on a control program stored in the ROM 143 with utilizing the RAM 144 as a work memory to achieve a facsimile transmission process.

To the IC card connector 146, IC cards 147 are detachably inserted, and when the control program in the ROM 143 is updated, an IC card 147 in which the control program for updating operation is stored, is inserted to the IC card connector 146.

The printer option 130 and the facsimile option 140 are connected to the main body of digital copy machine 100 by the UART 102, 131 and 141 which are communication means and an application image bus which is an image data bus, the main body 101 communicates with the respective options 130 and 140 for control data by the UART 102, 131 and 141, for image data through the application image bus, consequently the digital copy machine 100 carries out function and operation as a series of composite machines.

Figure 4:
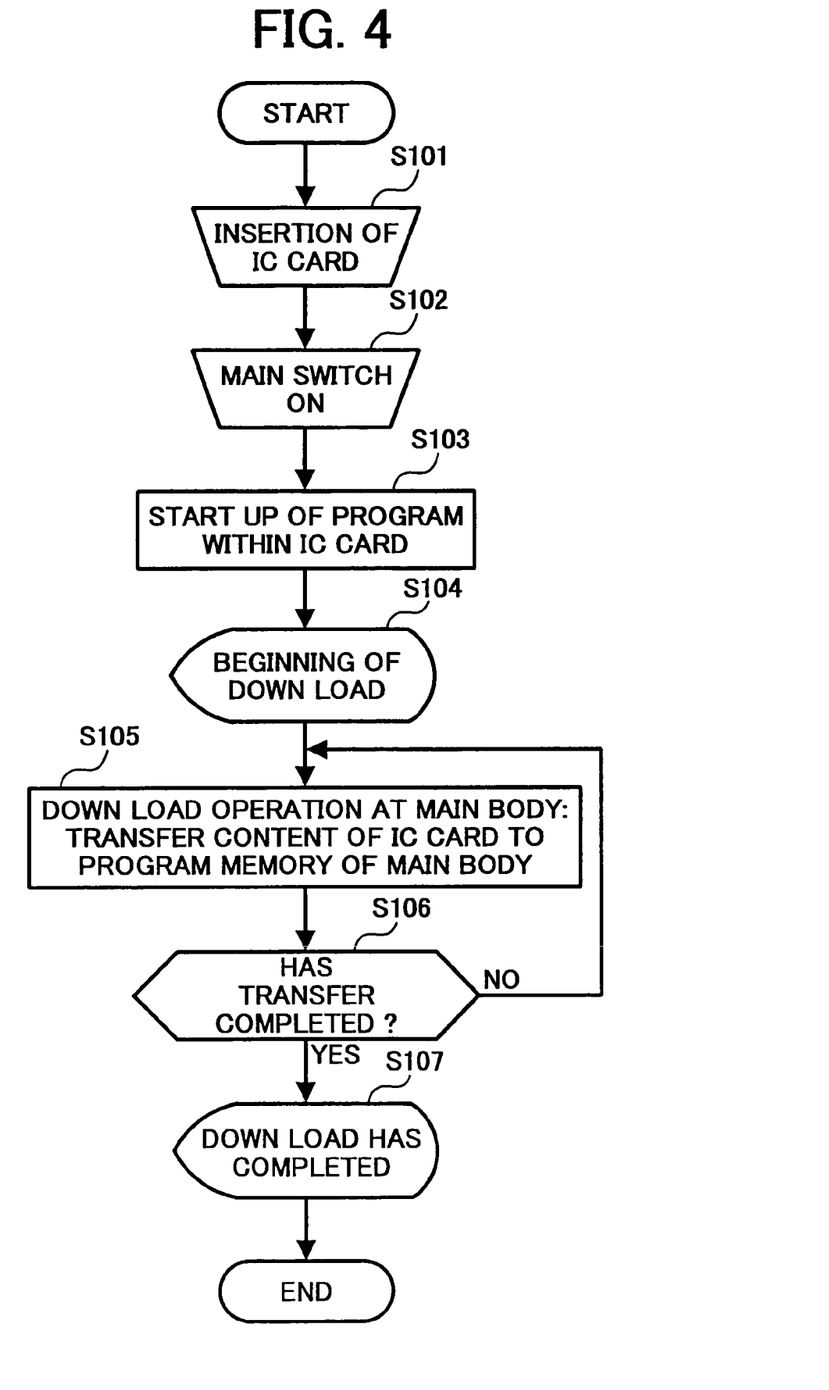
FIG. 4 is a flow chart showing a down load operation for the control program of IC card for the digital copy machine in the prior art technology shown in FIG. 3.

In the digital copy machine 100 in the prior art when a necessity for updating of the control program is occurred in the main body 101 or in the respective options 130 and 140, as shown in FIG. 4, an IC card 113,137 or 147 in which a program to be updated and a control program for updating operation are stored, is inserted and connected to the IC card connector 112, 136 or 146 of the main body 101, or option 130 or 140 on which the necessity for updating of program is occurred (Step S101). Then a power switch of the main body 101 is turned on (Step S102), and the program to be updated in the IC card 113, 137 or 147 is activated (Step S103), consequently exchange of the addresses of ROM 110, 133 or 143 on a memory map and the addresses of the IC card 113, 137 or 147 is achieved. Then the main body 101 or the respective options 130 and 140 is activated by the control program for updating operation in the IC card 113, 137 or 147, and a down load of the control program is begun (Step S104), and the control program stored in the IC card 113, 137 or 147 is sequentially transferred until the control program is completely transferred (Step S105–S106).

When the transfer of control program has been completed in the Step 106, the down load is terminated (Step S107).

As a consequence, on the digital copy machine 100 in the prior art, working hours for program updating operation could be drastically shortened.

However, in the image forming apparatus, that is to say the digital copy machine 100 in the prior art as above described, because the same down load method is adopted at the main body 101 and the respective options 130 and 140, the IC card connector 112, 136 and 146 are required in every circuit board, that is to say in every main body 101 and the respective options 130 and 140, it brings a problem causing higher cost for the apparatus because the structure of apparatus becomes complicated.

SUMMARY OF THE INVENTION

Therefore, an object of the present invention is to provide an inexpensive data control apparatus, data control method thereof and an image forming apparatus in which the down load of program to all extension devices can be carried out with only one connecter mounted in the main body without mounting of the IC card connector in the respective extension devices, and a periodical data exchange, a recovery disposition during error occurrence and so on can be easily achieved because a transfer of control data is made possible even during the down load operation is being performed.

In accordance with a first aspect of the present invention a data control apparatus comprises: an extension devices interface to which a plurality of extension devices are connectable; a recording media interface to which predetermined external recording media are detachably applied; a rewritable program memory of a main body to store a control program of the main body; a control means for controlling the respective devices and for processing input image data on the basis of the control program of the main body; and an image control means to achieve control based on the control of the control means for recording and outputting the image data which have been processed and outputting them to any one of the extension devices. The apparatus is characterized in that the extension devices interface includes a control data communication means for transferring and receiving control data with the extension devices, and a down load exclusive communication means for down loading a control program for the extension device of the extension devices, a data control method thereof and an image forming apparatus are provided.

In accordance with a second aspect of the present invention a data control apparatus is characterized in that the control means controls the image control means to transfer the control program stored in the external recording medium to the program memory of the main body when the external recording medium in which the control program of the main body is stored is applied to the recording media interface, and the control means controls the image control means to transfer the control program stored in the external recording medium through the down load exclusive communication means to a program memory of corresponding the extension device when the external recording medium in which control program of the extension device is stored is applied to the recording media interface, a data control method thereof and an image forming apparatus are provided.

In accordance with a third aspect of the present invention a data control apparatus is characterized in that the down load exclusive communication means transfers the control program of the extension device in the same communication method as the control data communication means, a data control method thereof and an image forming apparatus are provided.

In accordance with a fourth aspect of the present invention a data control apparatus is characterized in that the down load exclusive communication means is different from the control data communication means in at least one of the data transfer rate thereof or the data format thereof, a data control method thereof and an image forming apparatus are provided.

According to the first aspect of the present invention, a periodical data exchange, a recovery disposition during error occurrence and so on can be easily carried out because the transfer and receiving of control data between the data control apparatus and the extension devices is achieved through the control data communication means, and the down load for the extension devices is carried out through the down load exclusive communication means, and a transfer and receiving of control data is made possible even during the down load operation is being performed.

According to the second aspect of the present invention, it can be achieved to make extension peripheral devices and so on inexpensively because the control means controls the image control means to transfer the control program stored in the external recording medium to the program memory of the main body when the external recording medium in which the control program of the main body is stored is applied to the recording media interface, and the control means controls the image control means to transfer the control program stored in the external recording medium through the down load exclusive communication means to a program memory of corresponding said extension device when said external recording medium in which the control program of the extension device is stored is applied to the recording media interface, and there is no need to furnish the recording media interface in every extension peripheral devices.

According to the third aspect of the present invention, more inexpensive and convenient data control apparatus can be provided because the down load exclusive communication means transfers control program of the extension device in the same communication method as the control data communication means, a compatibility of the hardware configuration and the software composition of down load exclusive communication means and control data communication means is enhanced, and it can be carried out to simplify the process.

According to the fourth aspect of the present invention, because the down load exclusive communication means is different from the control data communication means in at least one of the data transfer rate thereof or the data format thereof, in comparison with the usual control data transfer and receiving includes an exchange of some byte of command and so on, a down load requires much time to transfer the data of some Mbyte, high speeded data transfer can be realized and a performance of the device can be improved through an elimination of parity check and simplification of the data format when the down load of control program for the extension devices is achieved.

DETAILED DESCRIPTION OF THE EMBODIMENTS

Hereinafter the preferred embodiments of the present invention will be described with reference to the attached drawings. Herein because the embodiments hereinafter described are mere examples of preferred embodiments of the present invention, technically desirable restrictions are added to it, however, it is not intended to limit scopes of the present invention to the aspect of these embodiments as far as no special mention to restrict the present invention is given in the following description.

Figure 1A:
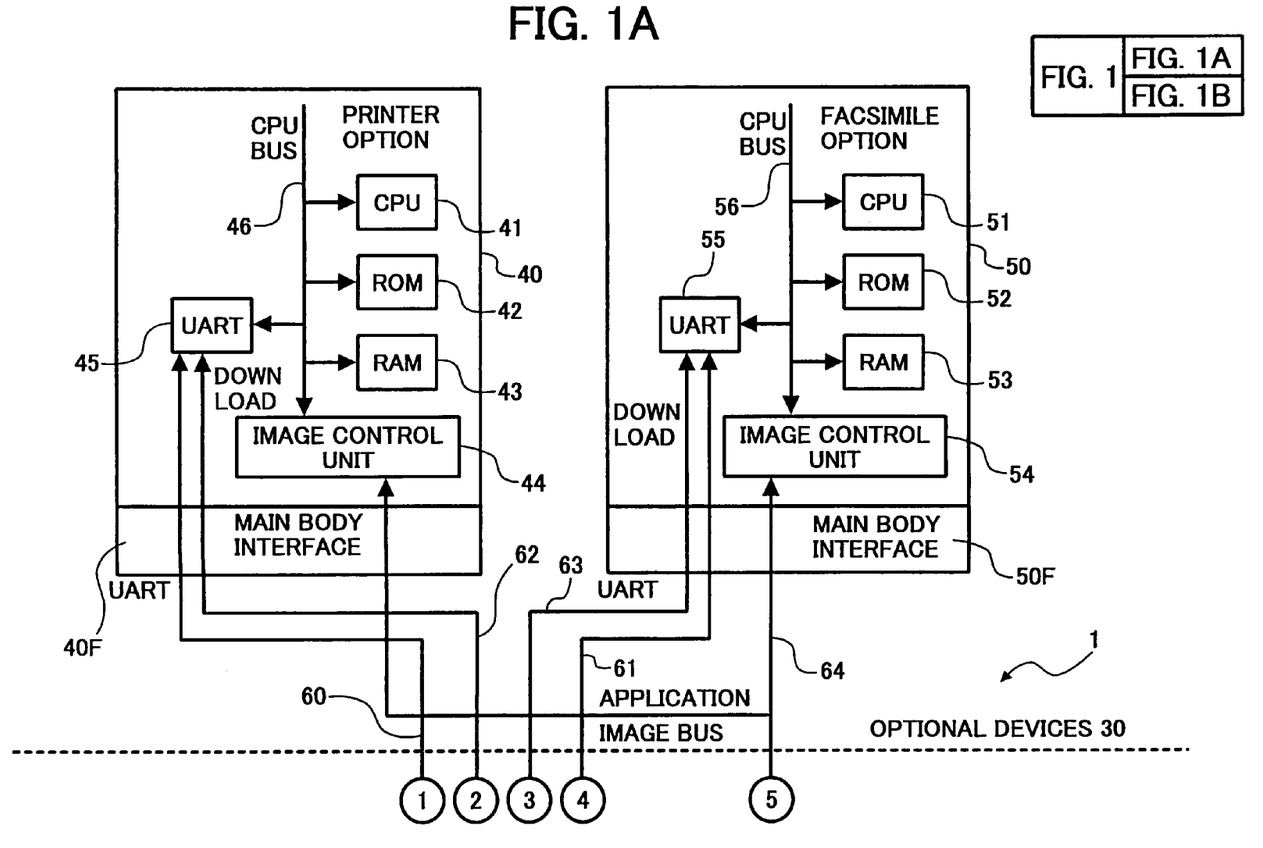
FIG. 1 is a block diagram showing a structure of relevant portion of a digital copy machine as an image forming apparatus according to the present invention.
Figure 1B:
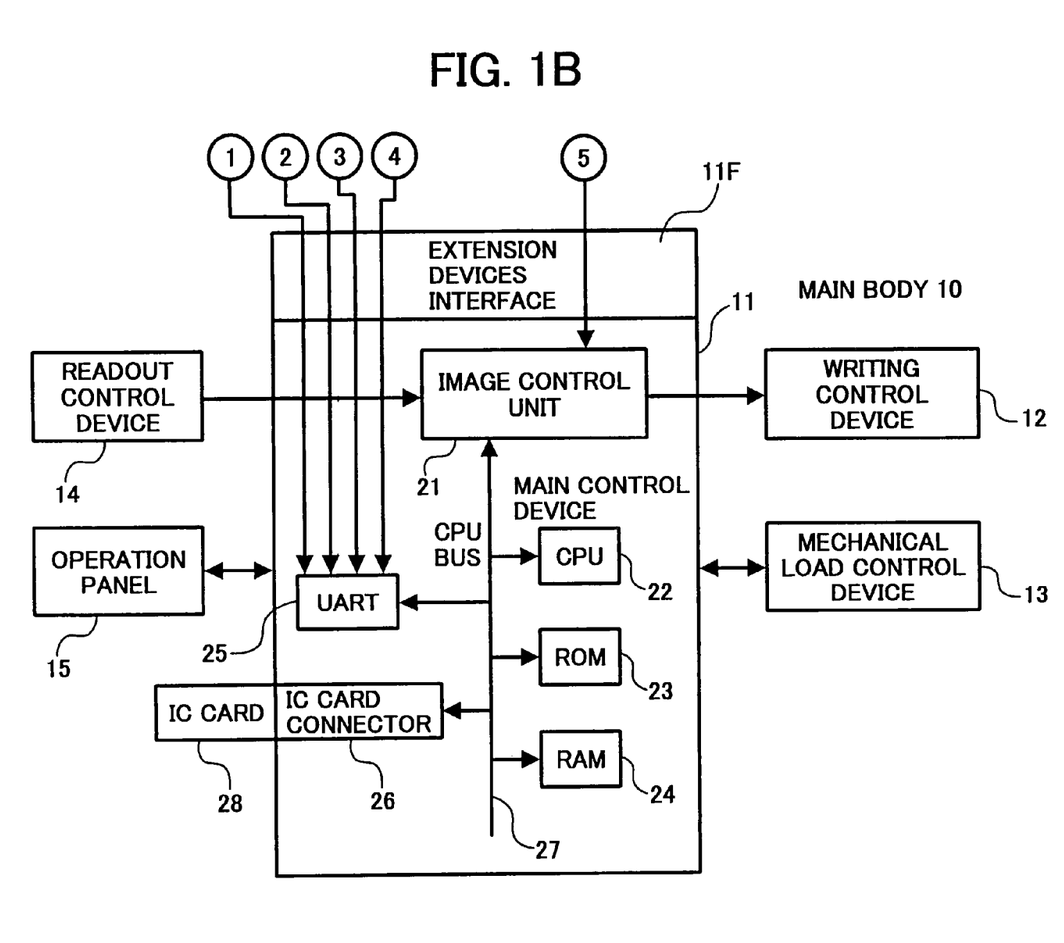
Figure 2A:
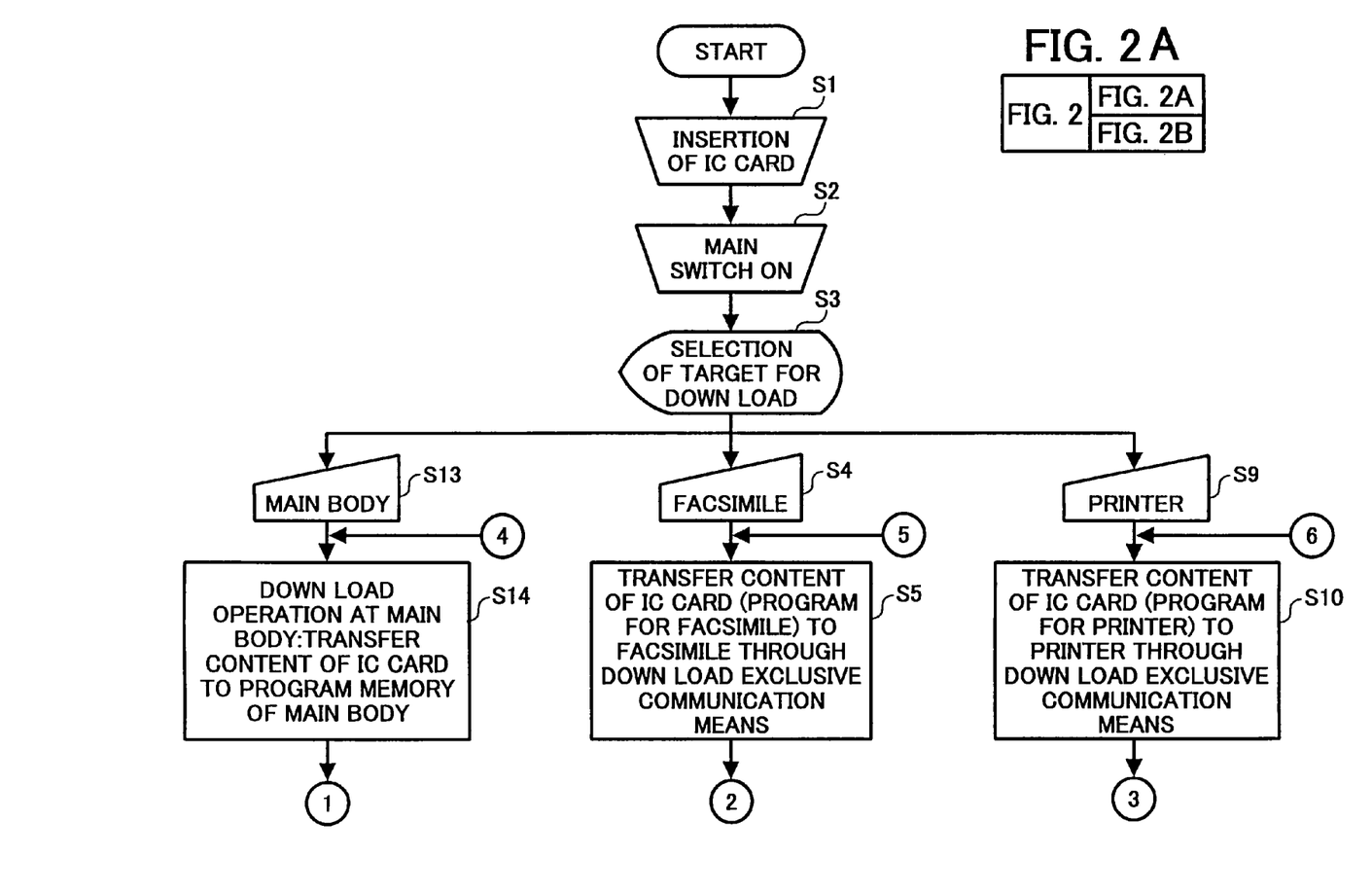
FIG. 2 is a flow chart showing a down load operation for the control program of IC card for the digital copy machine shown in FIG. 1.
Figure 2B:
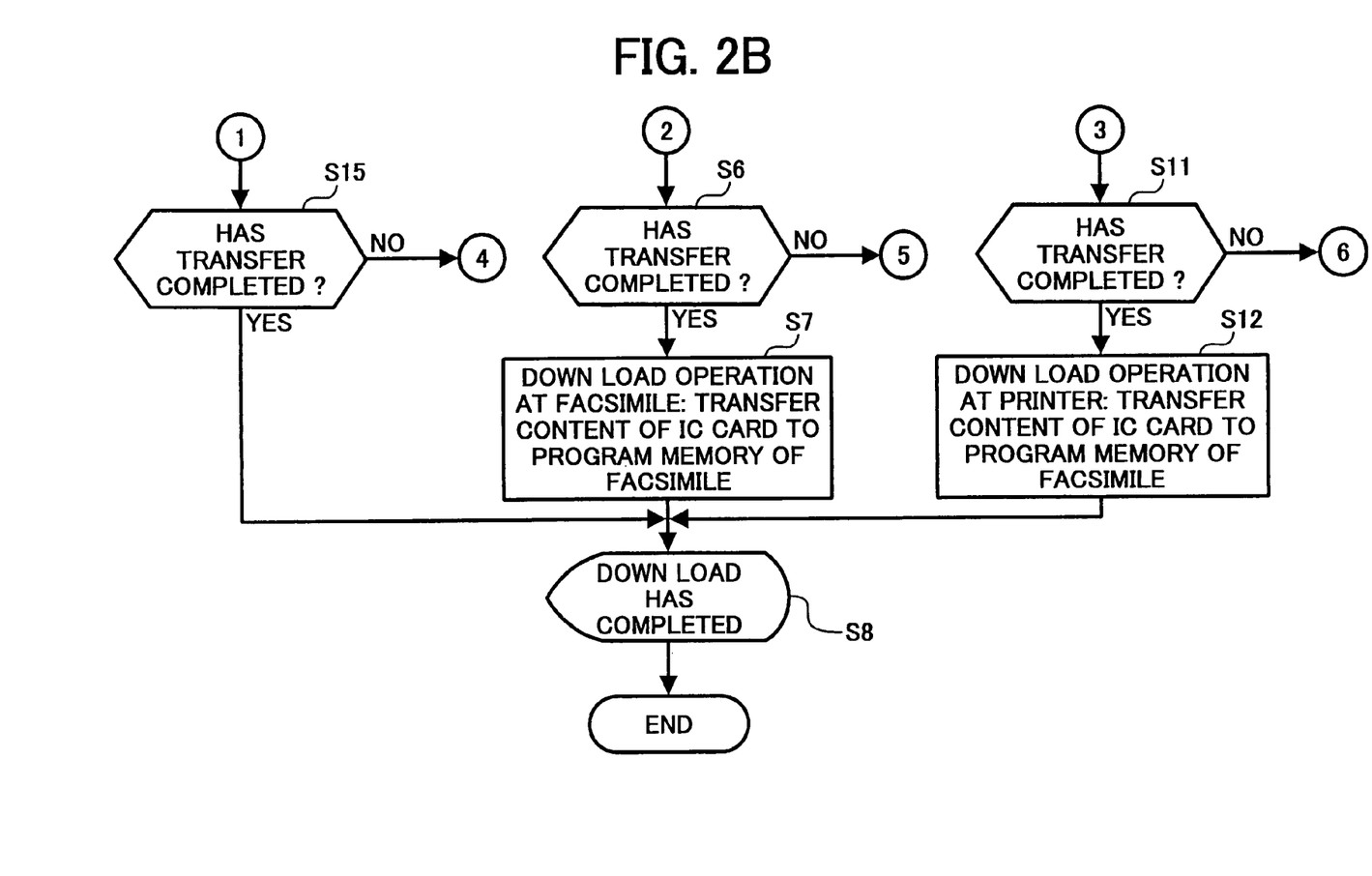

Referring to FIGS. 1 and 2, one example of an image forming apparatus including a data control apparatus according to the present invention is shown.

In FIG. 1, a digital copy machine 1 as an image forming apparatus has a main body 10, in which a printer option 40 and a facsimile option 50 are installed as optional devices (extension peripheral devices) 30 through an extension peripheral device interface 11F.

The main body 10 includes a main control device (data control apparatus) 11, a writing control device (writing control means) 12, a mechanical load control device 13, a readout control device (readout control means) 14, a operation panel 15 and so on. The main control device 11 includes an image control unit 21, a CPU 22, a ROM 23, a RAM 24, a UART (universal asynchronous receiver transmitter; asynchronous serial communication) 25, an IC card connecter 26 and so on. The image control unit 21, CPU (control means) 22, ROM (Memory for first program) 23, RAM 24, UART 25 and IC card connecter 26 are connected together by a CPU bus 27. As for the ROM 23, a flash ROM which can be rewritten any number of times, is used.

The main control device (control means) 11 controls the respective devices of the digital copy machine 1 on the basis of a control program stored in the ROM 23 with utilizing the RAM 24 as a work memory to achieve processes as a digital copy machine 1.

An image scanning device (not shown) which actually reads out image of manuscript is connected to the readout control device 14. The image scanning device is controlled to read out the image of manuscript by the readout control device 14 under control of the CPU 22, then the read out image data are output to the image control unit 21 of main control device 11.

Various types of keys (not shown) and a display (not shown) are furnished in the operation panel 15 to display various information on the display under control of the main control device 11 and to output content of key manipulation to the main control device 11.

A printing engine (not shown) is connected to the writing control device 12 to output for recording an image on a recording paper in the electrophotography method. The printing engine is made to output and to record an image based on the image data sent from the image control unit 21 on the recording paper by the writing control device 12 under control of the main control device 11, that is to say, under control of the CPU 22.

The mechanical load control device 13 controls various types of machinery mechanisms under control of the main control device 11.

To the IC card connector (recording media interface) 26, an IC card (recording medium) 28 is detachably inserted. And when the control program of main body 110 and optional devices 30 such as printer option 40 and facsimile option 50, are updated, an IC card (ICCARD) 28 in which the control program for updating operation is stored, is inserted to the IC card connector 26.

The printer option 40 is provided with a CPU 41, a ROM (memory for second program) 42, a RAM 43, an image control unit 44, a UART 45 and so on, and the respective devices are connected together by a CPU bus 46. As for the ROM 42, a flash ROM which can be rewritten any number of times, is used.

In the printer option 40, the CPU 41 controls the respective devices of the printer option 40 on the basis of a control program stored in the ROM 42 with utilizing the RAM 43 as a work memory to achieve a printing process.

The facsimile (FAX) option 50 is provided with a CPU 51, a ROM (memory for second program) 52, RAM 53, image control unit 54, a UART 55 and so on, and the respective devices are connected together by a CPU bus 56. As for the ROM 52, a flash ROM which can be rewritten any number of times, is used.

In the facsimile option 50, the CPU 51 controls the respective devices of the facsimile option 50 based on a control program stored in the ROM 52 with utilizing the RAM 53 as a work memory to achieve a facsimile transmission process.

The UART (communication means) 25 of the main body 10 in the digital copy machine 1, and the UART (communication means) 45, 55 of printer option 40 and facsimile option 50 are connected together through the respective interfaces 11F, 40F and 50F by control data lines (control data communication means) 60, 61 as well as down load exclusive lines (down load exclusive communication means) 62, 63. The image control units 21, 44 and 54 are, also, connected together by an application image bus 64 through the respective interfaces 11F, 40F and 50F.

The main body 10 and the respective options 40, 50 transfer and receive the control data by the UART 25, 44 and 55 through the control data lines 60, 61 and at the same time achieve down load of the control program through the down load exclusive lines 62, 63. The main body 10 and the respective options 40, 50 transfer and receive the image data through the application image bus 64, in this manner the digital copy machine 1 achieves a sequence of function and operation as a composite machine and down load of the control program.

As above described, in the digital copy machine 1 according to the embodiment of the present invention, the IC card connector 26 is built in only at the main body 10 and it is not built in at neither of the printer option 40 nor the facsimile option 50 as the optional device 30. And the UART 25 of main body 10 and the UART 45, 55 of the respective optional devices 30 are connected by the down load exclusive lines 62, 63 through the respective interfaces 11F, 40F and 50F.

Also, in the digital copy machine 1, because the UART is at the same time selected as a communication method for both of the exclusive communication for down load and the communication for control data, it makes possible to simplify the hardware configuration and software composition.

In the digital copy machine 1 according to the above described embodiment, the UART 25, 45 and 55 are employed for communication between the main body 10 and the optional devices 30, the other non-synchronized serial communication method such as USB and so on also can be employed. Of course, any synchronized serial communication method may be used.

[Operation]

Hereinafter an operation of the digital copy machine 1 according to the embodiment will be described with reference to the flowchart shown in FIG. 2.

When the control program of the main body 10 is down loaded, an IC card 28 in which the control program for the main body 10 is stored, is inserted to the IC card connector 26 (Step S1), and a power switch of the main body is turned on (Step S2). Then the program to be updated in the IC card 28 is activated to select which is a target for down load among the main body 10, printer option 40 and facsimile option 50 (Step S3).

In this occasion, because the control program in the main body 10 is down loaded, the main body 10 is selected (Step S13) and the control program stored in the IC card 28 is transferred to the ROM 23 in Step S14, then a control program stored in the ROM 23 is overwritten with the control program stored in the IC card 28. That is to say, the down load operation for the main body is carried out. In Step S15 it is confirmed whether or not whole of control program stored in the IC card 28 is transferred, and when the result is NO, the flow of operation returns to Step S14 and when the result is YES, the flow of operation goes to Step S8. In Step 8 the down load operation is terminated.

When the control program of the optional devices 30 is rewritten, an IC card 28 in which the control program of the optional device 30, that is to say the printer option 40 or the facsimile option 50 is stored, is inserted to the IC card connector 26 of main body 10, and the power switch is turned on, then a control program in the ROM 42 or 52 of target optional device 30 can be updated.

That is to say, in the same manner as described above, an IC card 28 in which the control program for updating operation for the printer option 40 or the facsimile option 50 is stored, is inserted and connected to the IC card connector 26 of main body 10 (Step S1), and a power switch of the main body is turned on (Step S2), then the program to be updated in the IC card 28 is activated to select which is the target for down load between the printer option 40 and the facsimile option 50 (Step S3).

It is supposed that in this occasion the facsimile option 50 is the target for updating (Step S4), the control program stored in the IC card 28 is transferred from the UART 25 to the UART 55 of facsimile option 50 through the down load exclusive line 63 (Step S5), while it is confirmed if the transfer is completed (Step S6), the control program stored in the IC card 28 is transferred to the facsimile option 50 until the complete transfer is achieved (Step S5).

When the transfer of control program to the facsimile option 50 is completed, the down load operation at the facsimile option 50, that is overwriting operation of the control program stored in the ROM 52 with the control program transferred to the facsimile option 50 is carried out (Step S7), and when the down load operation at the facsimile option 50 is completed, the whole down load operation is terminated (Step S8).

When it is supposed that the printer option 40 is the target for down load (Step S9), the control program stored in the IC card 28 is transferred from the UART 25 to the UART 45 of printer option 40 through the down load exclusive line 62 (Step S10), while it is confirmed if the transfer is completed (Step S11), the control program stored in the IC card 28 is transferred to the printer option 40 until the complete transfer is achieved (Step S10).

When the transfer of control program to the printer option 40 is completed, the down load operation at the printer option 40, that is overwriting operation of the control program stored in the ROM 42 with the control program transferred to the printer option 40 is carried out (Step S12), and when the down load operation at the printer option 40 is completed, the whole down load operation is terminated (Step S8).

In a case when a UART is employed to transfer and receive the control data between the optional device 30 as an external device and the main body 10 of digital copy machine 1 as the image forming apparatus, usually the transfer rate within a range of 4,800 bps–14,400 bps is used because every transfer and receiving of data is accomplished containing several bytes.

The size of control program of the main body 10 in the digital copy machine 1 and the optional devices 30 as an external device, does of course depend on a scale of the system, usually 1–2 M byte.

When it is supposed that a capacity of the control program of the optional device 30 is 2 Mbyte and a transfer condition of the UART is baud rate: 9,600 bps, data bit: 8 bit, start bit: 1 bit, parity bit: 1 odd bit and stop bit: 1 bit, it requires time of a multiplication of the bit amount by the transfer rate in 1 byte transfer, it brings, $(1+8+1+1)\times 1/9600 = 1.146$ ms.

In consequence, in case where a transfer interval is ignored, to transfer the control program of 2 Mbyte requires 1.146 ms/byte$\times$2 Mbyte=2403 s=40 min, and it is not practical as a time length for down load, and there might be a fear for user to feel pressured with stress.

For that reason, in the digital copy machine 1 according to the embodiment of the present invention the transfer rate of the UART is accelerated much higher than an usual control data transfer.

For example, when the baud rate is given as 307,200 bps instead of 9600 bps (32 times), to transfer the control program of 2 Mbyte requires $(1+8+1+1)\times 1/307200/\text{byte}\times 2$ Mbyte=75.1 s, it is not so long to feel pressured with stress.

Moreover, when the parity bit is eliminated, to transfer the control program of 2 Mbyte requires $(1+8+0+1)\times 1/307200/\text{byte}\times 2$ Mbyte=68.3 s, and further speeding up can be attained.

As described above, higher speed of data transfer is possible to depend on changing one or both of the data transfer speed and/or data format, and higher performance can be intended.

In addition, when the same communication method for communication of the control data transfer and for communication of the down load exclusive transfer is employed, it brings easier control of software. At the same time, when a sophisticated communication method with low transfer rate is employed for the former transfer and higher communication method capable of much larger amount of data transfer is employed for the latter transfer, the down load can be surely attained in much shorter time by charging the former communication method to check errors and so on.

As above described, although the invention has been specifically explained with reference to the preferred embodiments, it should be noted that the scope of the invention is not limited to the above aspects and that various modifications and alterations can be made to the aforementioned embodiments without departing the scope of the invention.

What is claimed is:

1. A data control apparatus comprising:
    an extension devices interface to which a plurality of extension devices are connectable;
    a recording media interface to which predetermined external recording media are detachably applied;
    a rewritable program memory for a main body to store a control program of the main body;
    a device control means for controlling the respective devices and for processing input image data on the basis of the control program of the main body; and
    an image control means to achieve control based on said device control means for recording and outputting the image data which have been processed and outputting them to any one of said extension devices;
    said extension devices interface including a control data communication means for transferring and receiving control data with said extension devices, and a download exclusive communication means for downloading a control program of a corresponding extension device of said extension devices.

2. A data control apparatus as claimed in claim 1, wherein said device control means controls said image control means to transfer the control program stored in a first external recording medium of said external recording media to said rewritable program memory for the main body when said first external recording medium storing said control program of the main body is applied to said recording media interface, and
    said device control means controls said image control means to transfer the control program stored in a second external recording medium through said download exclusive communication means to a program memory of the corresponding extension device when the second external recording medium storing said control program of the corresponding extension device is applied to said recording media interface.

3. An image forming apparatus comprising:
    a readout control means to read out an image of a manuscript;
    a writing control means to output the image on a recording paper; and
    a data control apparatus to make said readout control means reading out the image of the manuscript and to make said writing control means recording and outputting the read out image,
    said data control apparatus including an extension devices interface to which a plurality of extension devices are connectable,
    a recording media interface to which predetermined external recording media are detachably applied,
    a rewritable program memory for a main body to store a control program of the main body,
    a device control means for controlling the respective devices and for processing input image data on the basis of the control program of the main body, and
    an image control means to achieve control based on said device control means for recording and outputting the image data which have been processed and outputting them to any one of said extension devices,
    said extension devices interface having a control data communication means for transferring and receiving control data with said extension devices, and a download exclusive communication means for downloading a control program of the a corresponding extension device of said extension devices.

4. An image forming apparatus as claimed in claim 3, wherein said device control means controls said image control means to transfer the control program stored in a first external recording medium of said external recording media to said rewritable program memory of the main body when said first external recording medium storing said control program of the main body is applied to said recording media interface, and
    said device control means controls said image control means to transfer the control program stored in a second external recording medium through said download exclusive communication means to a program memory of the corresponding extension device when the second external recording medium storing said control program of the corresponding extension device is applied to said recording media interface.

5. A data control method comprising the steps of:
    overwriting a program registered in a program memory of a main body of a data control apparatus;
    downloading control programs of extension devices to a plurality of extension devices which are connected to an extension device interface of said data control apparatus;
    transferring and receiving control data between said extension devices and said data control apparatus through control data communication means; and
    downloading said control programs for the extension devices through download exclusive communication means.

6. A data control method as claimed in claim 5, wherein said method further comprises the steps of:
    transferring the a data control apparatus control program stored in said a first external recording medium to said program memory of the main body when sa the first external recording medium in which storing said control program of the main body is applied to a recording media interface of the data control apparatus; and
    transferring the an external device control program stored in said a second external recording medium through said download exclusive communication means to a program memory of a corresponding extension device when an the second external recording medium in which storing said control program of the corresponding extension device is applied to said recording media interface of the data control apparatus.

7. A data control method as claimed in claim 5 or 6, wherein said control data communication means and said download exclusive communication means are of asynchronous of synchronous serial communication.

8. A data control apparatus as claimed in claim 1 or 2, wherein said download exclusive communication means transfers said control program of the corresponding extension device the in a same communication method as said control data communication means.

9. A data control apparatus as claimed in claim 1 or 2, wherein said download exclusive communication means is different from said control data communication means in at least one of the a data transfer rate thereof or the a data format thereof.

10. A data control method as claimed in claim 5, wherein said download exclusive communication means is different from said control data communication means in at least one of the a data transfer rate thereof or the a data format thereof.

11. An image forming apparatus as claimed in claim 3 or 4, wherein said download exclusive communication means transfers said control program of the corresponding extension device in the a same communication method as said control data communication means.

12. An image forming apparatus as claimed in claim 3 or 4, wherein said download exclusive communication means is different from said control data communication means in at least one of the a data transfer rate thereof or the a data format thereof.

13. A data control apparatus as claimed in claim 8, wherein said download exclusive communication means is different from said control data communication means in at least one of the a data transfer rate thereof or the a data format thereof.

14. A data control apparatus as claimed in claim 1 or 2, wherein said control data communication means and said download exclusive communication means are of asynchronous or synchronous serial communication.

15. An image forming apparatus according to claim 3 or 4, wherein said control data communication means and said download exclusive communication means are of asynchronous or synchronous serial communication.

16. A data control apparatus comprising:
an extension devices interface to which a plurality of extension devices are connectable;
a recording media interface to which predetermined external recording media are detachably applied;
a rewritable program memory for a main body to store a control program of the main body; and
a device controller configured to control the respective devices and to process input image data on the basis of the control program of the main body; and
an image controller configured to record and output the processed image data to any one of the extension devices based on the device controller;
wherein the extension devices interface includes a control data communicator and a download exclusive communicator,
wherein the control data communicator is configured to transfer and receive control data with the extension devices, and
wherein the download exclusive communicator is configured to transfer from the extension devices interface to one of the extension devices a control program to be updated to control one of the extension devices.

17. The data control apparatus according to claim 16, wherein, when the program to be updated is activated, the data control apparatus is configured to select one of the plurality of extension devices or the main body as a target for download, and executes the download to the selected extension device or the main body.

18. The data control apparatus according to claim 16, wherein said device control controls said image controller to transfer the control program stored in the a first external recording medium of said external recording media to the rewritable program memory for the main body when the first external recording medium storing the control program of the main body is applied to the recording media interface, and
the device controller controls the image controller to transfer the control program stored in the a second external recording medium through the download exclusive communicator to a program memory of a corresponding one of the extension devices when the second external recording medium storing the control program of the corresponding extension device is applied to the recording media interface.

19. The data control apparatus according to claim 16, wherein a transfer rate at a time of downloading the control program is higher than a transfer rate at a time of another control data transfer.

20. A data control apparatus comprising:
an extension devices interface to which a plurality of extension devices are connectable;
a recording media interface to which predetermined external recording media are detachably applied;
a rewritable program memory for a main body to store a control program of the main body; and
a device controller configured to control the respective devices and to process input image data on the basis of the control program of the main body;
wherein the extension devices interface includes a control data communicator and a download exclusive communicator,
wherein the control data communicator is configured to transfer and receive control data with the extension devices, and
wherein the download exclusive communicator is configured to transfer from the extension devices interface to one of the extension devices a control program to be updated to control one of the extension devices.

21. A data control apparatus as claimed in claim 20, wherein the device controller is configured to control an image controller to transfer the control program stored in the a first external recording medium of said external recording media to the rewritable program memory for the main body when the first external recording medium in which storing the control program of the main body is applied to the recording media interface, and
the device controller is configured to control the image controller to transfer the control program stored in the a second external recording medium through the download exclusive communicator to a program memory of a corresponding one of the extension devices when the second external recording medium storing the control program of the corresponding extension device is applied to the recording media interface.

22. An image forming apparatus comprising:
a readout controller configured to read out an image of a document;
a writing controller configured to output the image on a recording medium; and
a data control apparatus to make the readout controller read out the image of the document and to make the writing controller record and output the read out image,
the data control apparatus including an extension devices interface to which a plurality of extension devices are connectable,
a recording media interface to which predetermined external recording media are detachably applied,
a rewritable program memory for a main body to store a control program of the main body, and
a device controller configured to control the respective devices and for processing input image data on the basis of the control program of the main body,
wherein the extension devices interface includes a control data communicator and a download exclusive communicator,
wherein the control data communicator is configured to transfer and receive control data with the extension devices, and wherein the download exclusive communicator is configured to transfer from the extension devices interface to one of the extension devices a control program to be updated to control one of the extension devices.

23. An image forming apparatus as claimed in claim 22, wherein the device controller is configured to control an image controller to transfer the control program stored in the a first external recording medium of said external recording media to the rewritable program memory of the main body when the first external recording medium storing the control program of the main body is applied to the recording media interface, and the device controller is configured to control the image controller to transfer the control program stored in the a second external recording medium through the download exclusive communicator to a program memory of a corresponding one of the extension devices when the second external recording medium storing the control program of the corresponding extension device is applied to the recording media interface.

24. A data control method comprising the steps of:

overwriting a program registered in a program memory of a main body of a data control apparatus;

downloading control programs of extension devices to a plurality of extension devices which are connected to an extension device interface of the data control apparatus;

transferring and receiving control data between the extension devices and the data control apparatus through control data communicator; and downloading the control programs for the extension devices through a download exclusive communicator.

25. A data control method as claimed in claim 24, wherein the method further comprises the steps of:

transferring a data control apparatus control program stored in a first external recording medium to the program memory of the main body when the first external recording medium storing the control program of the main body is applied to a recording media interface of data control apparatus; and transferring an external device control program stored external recording medium through the download exclusive communicator to a program memory of a corresponding extension device when the second external recording medium storing the control program of the corresponding extension device is applied to the recording media interface of the data control apparatus.

26. A data control method as claimed in claim 24, wherein the control data communicator and the download exclusive communicator are of asynchronous or synchronous serial communication.

27. A data control apparatus as claimed in claim 20, wherein the download exclusive communicator is configured to transfer the control program of the one extension device in the a same communication method as the control data communicator.

28. A data control apparatus as claimed in claim 20, wherein the download exclusive communicator is different from the control data communicator in at least one of the a data transfer rate thereof or the a data format thereof.

29. A data control method as claimed in claim 24, wherein the download exclusive communicator is different from the control data communicator in at least one of the a data transfer rate thereof or the a data format thereof.

30. An image forming apparatus as claimed in claim 22, wherein the download exclusive communicator is configured to transfer the control program of the one extension device in the a same communication method as the control data communicator.

31. An image forming apparatus as claimed in claim 22, wherein the download exclusive communicator is different from the control data communicator in at least one of the a data transfer rate thereof or the a data format thereof.

32. A data control apparatus as claimed in claim 27, wherein the download exclusive communicator is different from the control data communicator in at least one of the a data transfer rate thereof or the a data format thereof.

33. A data control apparatus as claimed in claim 20, wherein the control data communicator and the download exclusive communicator are of asynchronous or synchronous serial communication.

34. An image forming apparatus according to claim 22, wherein the control data communicator and the download exclusive communicator are of asynchronous or synchronous serial communication.

* * * * *